United States Patent
Smith (12) 
(10) Patent No.: US 6,346,006 B1
(45) Date of Patent: Feb. 12, 2002

(54) ELECTRIC EXTENSION CORD

(76) Inventor: Edward E. Smith, P.O. Box 931, Bolton Landing, NY (US) 12814

( * ) Notice: Subject to any disclaimer, the term of this patent is extended or adjusted under 35 U.S.C. 154(b) by 0 days.

(21) Appl. No.: 09/668,310

(22) Filed: Sep. 25, 2000

Related U.S. Application Data (60) Provisional application No. 60/174,911, filed on Jan. 10, 2000.

(51) Int. Cl.$^7$ ................................................ H01R 13/72
(52) U.S. Cl. ...................................................... 439/501
(58) Field of Search ........................... 439/501, 4, 652, 439/651, 455, 532, 542, 536, 545; 191/12.4

(56) References Cited

U.S. PATENT DOCUMENTS

| | | | |
|---|---|---|---|
| 2,007,699 A | | 7/1935 | Wiebking |
| 2,848,731 A | | 8/1958 | Tamarin |
| 3,056,863 A | | 10/1962 | Johnson |
| 3,316,361 A | | 4/1967 | Thompson |
| 3,566,332 A | | 2/1971 | Bonhomme |
| 3,773,987 A | | 11/1973 | Davis et al. |
| 3,815,078 A | | 6/1974 | Fedrick |
| 4,114,736 A | | 9/1978 | Scherenberg |
| 4,282,954 A | | 8/1981 | Hill |
| 4,411,485 A | * | 10/1983 | Wiseheart et al. ...... 439/125 R |
| RE33,654 E | * | 8/1991 | Hoegh .......................... 33/449 |
| D324,669 S | * | 3/1992 | Co .............................. D13/140 |
| 5,236,371 A | | 8/1993 | Matthis |
| 5,521,806 A | * | 5/1996 | Hutzel et al. ................ 362/387 |
| 5,562,488 A | * | 10/1996 | Neiser et al. ................ 439/501 |
| 5,590,749 A | | 1/1997 | Wagner et al. |
| 5,657,841 A | | 8/1997 | Morvan |
| 5,700,150 A | * | 12/1997 | Morin ............................ 439/4 |
| 5,700,158 A | * | 12/1997 | Neiser et al. ................ 439/501 |
| 5,723,815 A | | 3/1998 | Pena |
| 5,738,548 A | | 4/1998 | Rutulante |
| 6,062,541 A | * | 5/2000 | Hampton ....................... 254/98 |
| D432,084 S | * | 10/2000 | Miller ..................... D13/137.4 |
| 6,161,943 A | * | 12/2000 | Chang ......................... 362/258 |

* cited by examiner

Primary Examiner—Gary Paumen
Assistant Examiner—Phuongchi Nguyen
(74) Attorney, Agent, or Firm—Nixon & Vanderhye P.C.

(57) ABSTRACT

By providing a unique electrical outlet cover plate and reeled electrical cord combination it is possible to securely yet readily removably fix a reeled extension cord to a conventional duplex or fourplex electrical outlet. The existing cover plate of the electrical outlet is removed and replaced with a replacement cover having a plurality of projections extending outwardly from it. A reeled electrical cord (e.g. an extension cord) has a male electrical plug on a back surface and slide with openings that cooperate with the projections of the replacement electrical receptacle cover so that when the male plug is inserted into a female electrical outlet with which the replacement cover is associated, the slide may be reciprocated to lock the reel to the cover plate.

20 Claims, 4 Drawing Sheets

ELECTRIC EXTENSION CORD

CROSS REFERENCE TO RELATED APPLICATION

This application is based upon provisional application 60/174,911 filed Jan. 10, 2000, the disclosure of which is incorporated by reference herein.

BACKGROUND AND SUMMARY OF THE INVENTION

There are many circumstances in which it is desirable to be able to have a reeled electrical cord, such as an extension cord or one specifically connected to or connectable to an appliance, that is usable with a standard electrical outlet, such as a duplex or fourplex outlet in most buildings and in some vehicles, without requiring any significant m modifications to the electrical receptacle. It is also desirable to have the reeled cord so that it can be readily removed from the electrical outlet so that it can be positioned in any one of a number of different electrical outlets, or even plugged into another electrical cord under some circumstances.

According to the present invention the above objectives are achieved in a very simple and cost effective manner. By making a minimum number of modifications to a conventional cover plate for an electrical outlet, and a conventional reeled electrical cord housing, it is possible to securely affix the cord housing to the electrical outlet during use, yet let readily detach the housing from the outlet so that the reeled cord may be used in other locations. All that is required according to a preferred embodiment of the invention is to provide a plurality of first locking surface manifestations (such as projections) on one of the elements, and a slideable element with cooperating second locking surface manifestations (such as elongated holes) on the other.

According to one aspect of the present invention an electrical outlet cover plate and reeled electrical cord combination is provided. The combination comprises the following components: An electrical outlet cover plate having a front surface, and at least two openings therein dimensioned and constructed so as to receive female electrical receptacles therethrough. A plurality of first locking surface manifestations formed with the front surface. A reeled electrical cord in a housing, the housing having a first surface. A plurality of second locking surface manifestations formed with the first surface for cooperating with the first locking surface manifestations to releasably hold the housing to the cover plate. And, a male electrical plug extending outwardly from the first surface and insertable into a female electrical receptacle passing through one of the openings in the cover plate while the locking surface manifestations hold the housing and cover plate together.

While a wide variety of conventional constructions may be utilized, and which locking surface manifestations are provided on which component may be switched, according to a preferred embodiment of the present invention the first locking surface manifestations comprise a plurality of projections, each having a shaft extending outwardly from the cover plate, and an enlarged head spaced from the cover plate; and the second locking surface manifestations comprise a plurality of elongated openings each having an enlarged portion larger than a cooperating projection head, and a channel portion wider than a cooperating projection shaft, but narrower than a cooperating projection head. Preferably the second locking surface manifestations are mounted to at least one slide, which is connected to and is slideable with respect to the housing. Preferably at least one slide comprises a single slide having two legs, which legs straddle the male electrical plug.

The electrical outlet cover plate used according to the invention may be entirely conventional except for the provision of the projections thereon (which may be welded to, provided as fasteners which are fastened to, or otherwise connected to an electrical outlet plate), while the reeled cord and the housing may comprise a conventional reeled extension cord. For example the reeled electrical cord has first and second ends, and at least one female plug at or adjacent the first end thereof exterior of the housing, and the male electrical plug is electrically connected to the second end of the reeled electrical cord.

The combination may further comprise a central screw-receiving opening in the cover plate between the receptacle-receiving openings therein. Also the combination may still further comprise at least one additional screw hole in the cover plate remote from the central screw-receiving opening, and spaced from the receptacle-receiving openings. The plurality of first and second locking surface manifestations comprises four each of the first and second locking surface manifestations. The combination may still further comprise at least first and second screws, passing through the central screw-receiving opening and the at least one additional screw hole, holding the cover plate to an electrical receptacle body comprising at least two female electrical receptacles, and holding the cover plate to a joist adjacent the receptacle body, respectively.

According to another aspect of the present invention there is a method of providing a securely affixed but readily movable extension cord in association with a duplex or fourplex electrical outlet in a building or vehicle, the electrical outlet including at least two female electrical receptacles in a wall of the building or vehicle and an existing cover plate, utilizing a replacement cover plate having a first plurality of surface manifestations, an electrical extension cord in a housing having a first surface, a plurality of second locking surface manifestations formed with the first surface, and a male electrical plug extending outwardly from the first surface. The method comprises: (a) Removing the existing cover plate. (b) Replacing the existing cover plate with the replacement cover plate. (c) Plugging the male electrical plug into one of the female electrical receptacles. And, (d) moving the first and second surface manifestations with respect to each other so that they engage each other and lock the housing to the replacement cover plate.

In the method (b) may be practiced using a central screw from the existing cover plate, and also by screwing the replacement cover to a joist adjacent the building or vehicle electrical outlet.

The second locking surface manifestations may be on a slide which is slideable with respect to the housing, in which case (d) is practiced by reciprocating the slide to move the first and second locking surface manifestations into operative locking association with respect to each other. For example the slide may have a plurality of openings therein forming the second plurality of locking surface manifestations, and the first locking manifestations comprise a plurality of projections extending outwardly from the replacement cover plate, in which case (d) is practiced by moving the openings and projections into operative association with each other, and then sliding the slide.

The invention also relates to, per se, a cover plate for a duplex or fourplex electrical outlet in a building or vehicle, the electrical outlet including at least two female electrical receptacles in a wall of the building or vehicle, comprising:

A plate of metal or relatively rigid plastic having a front surface and at least two openings therein dimensioned and constructed so as to receive female electrical receptacles therethrough. A plurality of locking projections integral with the front surface and extending outwardly therefrom. And at least one screw-receiving hole in the front surface for receipt of a fastening screw therein to attach the plate to an electrical outlet. For example each of the plurality of projections has a shaft extending outwardly from the cover plate in an enlarged head space from the cover plate. The plurality of projections may comprise four projections defining the corners of a rectangle within which the female receptacle-receiving openings are disposed. The cover plate may further comprise a receptacle-receiving opening-free portion of the cover plate having at least one additional screw-receiving hole therein for receiving a screw to attach the cover plate to a joist adjacent to the outlet in a building or vehicle.

According to another aspect of the present invention there is provided, per se, a reeled extension cord assembly comprising: A housing having a first surface. A reeled extension cord disposed within the housing and having first and second ends. At least one slide which is connected to, and is slideable with respect to, the housing first surface. A plurality of locking openings formed in the slide. A male electrical plug extending outwardly from the first surface and insertable in a female electrical receptacle. And, at least one female plug at or adjacent the first end or the extension cord exterior of the housing. And, wherein the male electrical plug is electrically connected to the second end of the reeled electrical cord.

The locking openings may comprise a plurality of elongated openings each having an enlarged portion larger than a cooperating projection head, and a channel portion wider than a cooperating projection shaft, but narrower than a cooperating projection head. Preferably the at least one slide comprises a single slide having two legs which straddle the male electrical plug. The plurality of locking openings preferably comprises four openings.

It is the primary object of the present invention to provide a highly versatile and easy to use reeled electrical cord readily positively associated with, but removable from, a conventional electrical outlet. This and other objects of the invention will become clear from an inspection of the detailed description of the invention and from the appended claims.

DETAILED DESCRIPTION OF THE DRAWINGS

Figure 1:
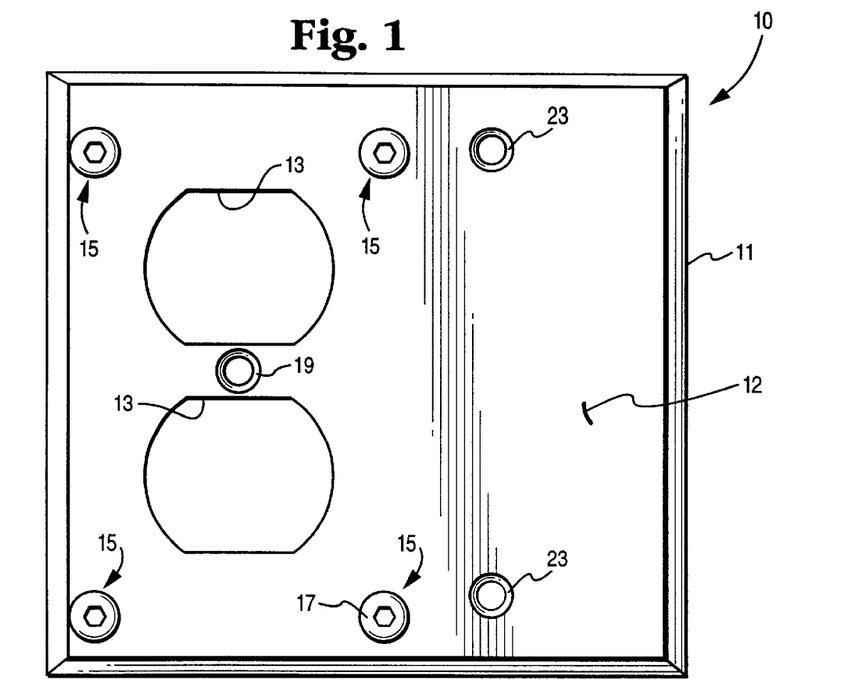
FIG. 1 is a top plan view of an exemplary replacement cover plate according to the present invention.
Figure 2:
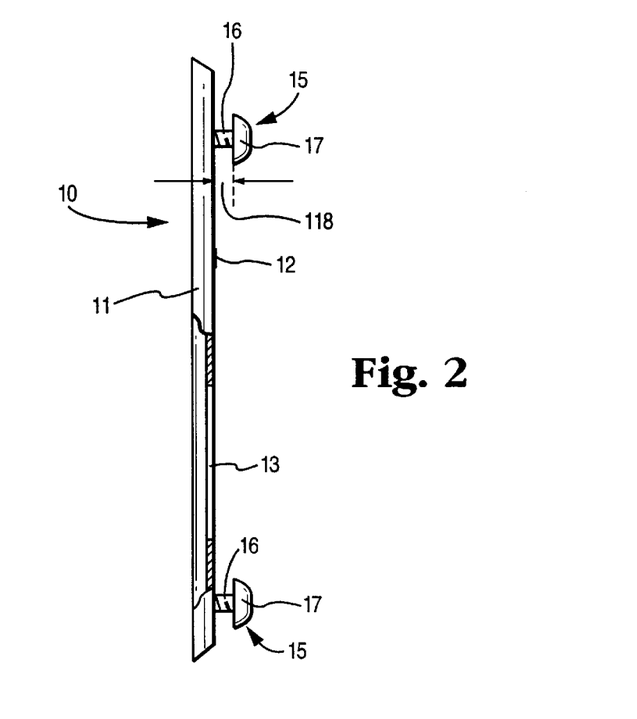
FIG. 2 is a side view, partly in cross-section, of the cover plate of FIG. 1.

An exemplary replacement cover plate, per se, according to the present invention which may be used in place of a conventional existing cover plate in a conventional duplex or fourplex electrical outlet in a building or vehicle, is shown generally by reference numeral 10 in FIG. 1. The cover plate 10 includes a plate 11 preferably of metal or a rigid plastic conventionally used for cover plates having a front surface 12 and at least two openings 13 therein dimensioned and constructed so as to receive conventional female electrical receptacles therethrough, such as the conventional female electrical receptacles illustrated schematically at 14 in FIG. 5. The cover plate 10 further comprises a plurality of locking projections—four in the exemplary embodiment illustrated in FIGS. 1 and 2—integral with the front surface 12 and extending outwardly therefrom, as best seen in FIG. 2. The projections 15 in the preferred embodiment illustrated in FIGS. 1 and 2 include a shaft 16 extending outwardly from the cover plate front surface 12, and an enlarged head 17 spaced from the front surface 12, the spacing 18 being sufficient to accommodate a slide component, as hereinafter described.

Figure 4:
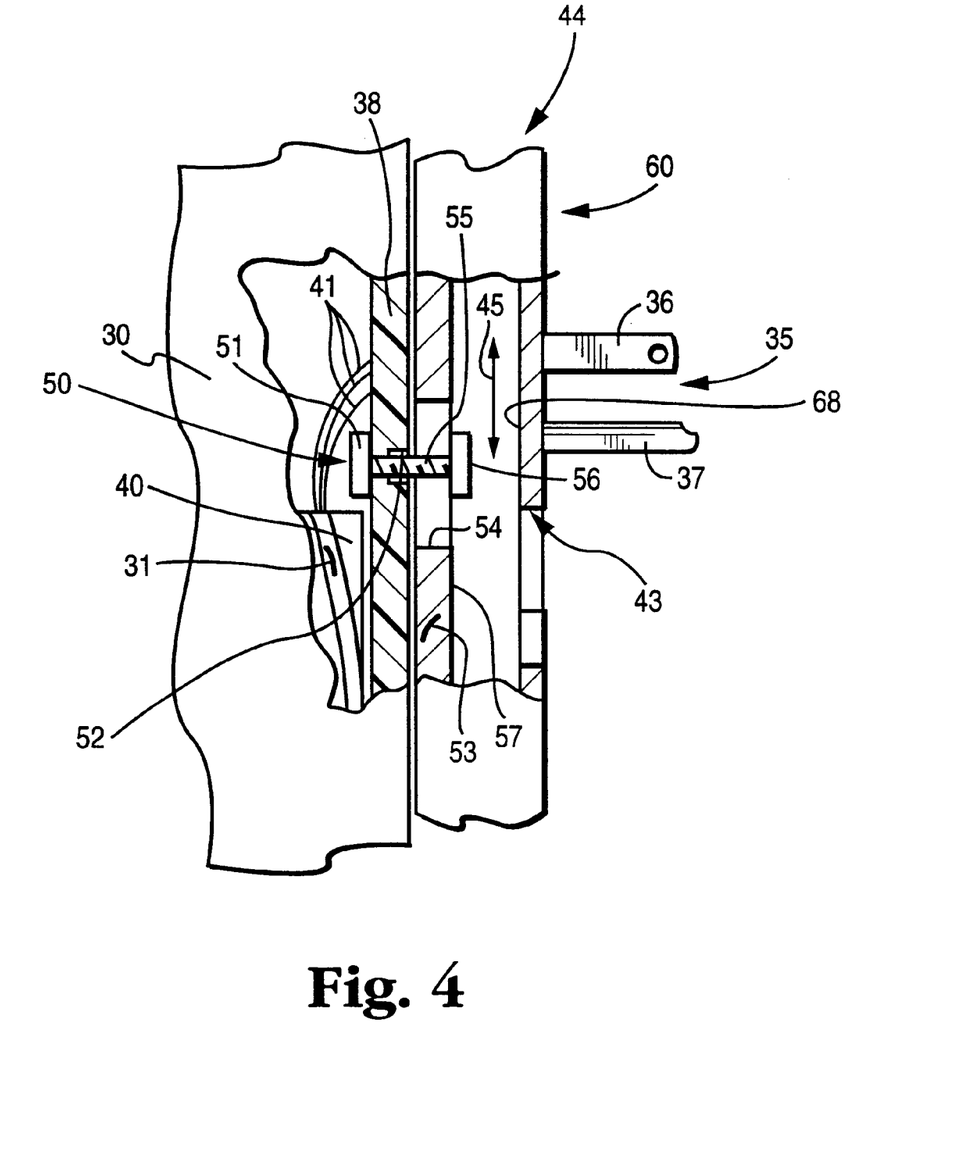
FIG. 4 is a detail side view, partly in cross-section and partly in elevation, showing the cooperation between the slide and housing and male electrical plug of the reeled cord of FIG. 3.
Figure 5:
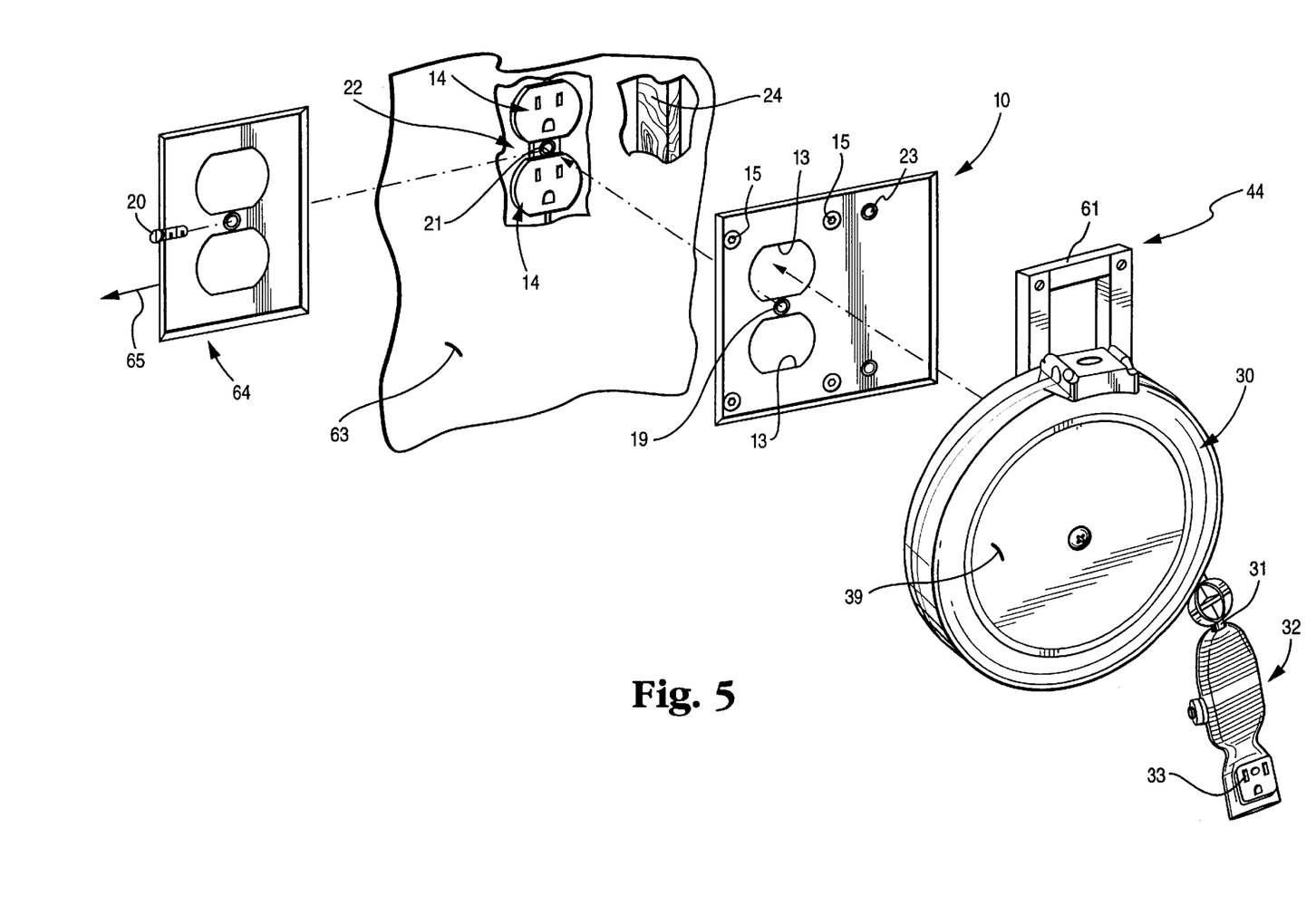
FIG. 5 is a schematic perspective view illustrating removal of a conventional electrical outlet cover plate and replacement thereof with a plate according to FIGS. 1 and 2, with the reeled electrical cord such as shown in FIGS. 3 and 4 associated therewith.

The cover plate 10 also comprises at least one screw receiving hole 19 (see FIG. 1) in the front surface 12 for receipt of a fastening screw (such as the conventional screw 20 illustrated in FIG. 5) therein to attach the plate 10 to a conventional duplex or fourplex electrical outlet, such as to the screw receiving opening 21 of the electrical outlet 22 schematically illustrated in FIG. 5. In the preferred embodiment illustrated in FIG. 1, at least one additional screw-receiving hole 23 is provided so as to more securely mount the cover plate 10 so that it will not be dislodged even if the reeled electrical cord to which it is positively secured has a significant force applied thereto. For example conventional screws could pass through both of the openings 23 in the plate 10 of FIG. 1 and extend into a joist adjacent the conventional duplex receptacle 22 (on either side thereof) of FIG. 4, such a joist being schematically illustrated at 24 in FIG. 5.

Figure 3:
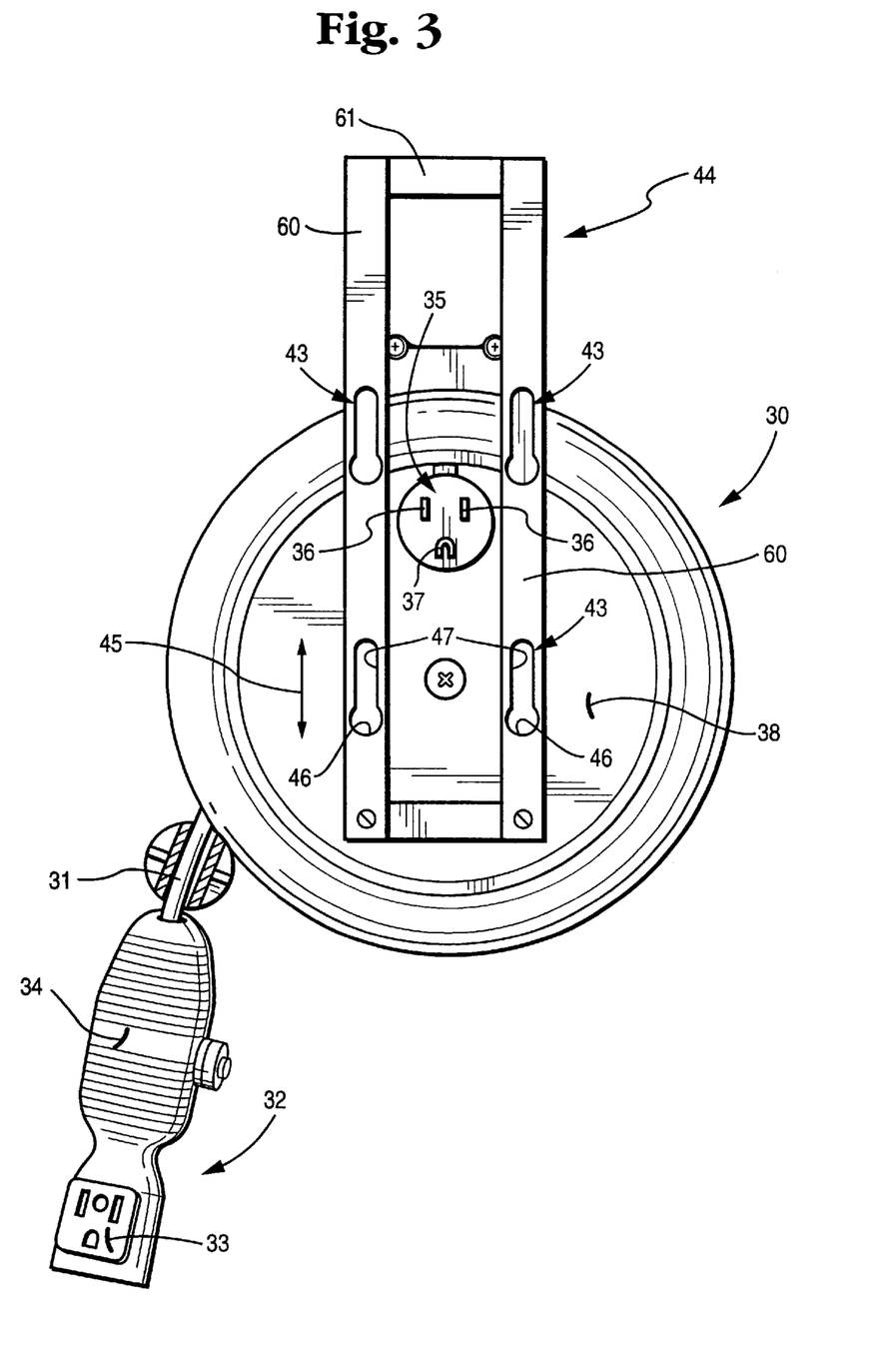
FIG. 3 is a rear view of a reeled extension cord according to the present invention.

The second component of the combination according to the present invention comprise a reeled electrical cord in a housing 30, seen in FIGS. 3 through 5. In the preferred embodiment illustrated the electrical cord, shown schematically at 31 in FIGS. 3 through 5, is an extension cord, although it may be an electrical cord that is uniquely adapted to, or integral with, an appliance or tool, such as a vacuum cleaner, electric drill, television, computer, etc. As is conventional per se the extension cord 31 may have a first end, shown schematically at 32 in FIGS. 3 and 5, which includes at least one female plug 33 at or adjacent thereof. If desired the end 32 also may have a built in conventional circuit breaker or fuse, and/or ground fault interrupter, in the housing 34, and any other conventional components associated with extension cords or the like may be associated therewith, including a lock for a male plug into the female plug(s) 33.

As also conventional per se, the housing 30 includes a male electrical plug 35 having two or three prongs 36, 37 associated therewith which extends outwardly from a first surface (e.g. back surface) 38 of the housing 30. The prongs 36, 37 are insertable into a conventional female outlet 14 which will have a plurality of openings dimensioned and spaced so as to receive the prongs 36, 37, as is conventional. The housing 30 also includes a front surface 39 (see FIG. 5) opposite the rear surface 38, and the interior of the housing 30 is entirely conventional, comprising a suitable reel shown schematically at 40 in FIG. 4, and a conventional slip ring connection of the plug 35 to the cord 31 (this is illustrated schematically by the wires 41 in FIG. 4).

According to the present invention, the housing 30 first surface 38 is operatively provided with a plurality of second locking surface manifestations which cooperate with the first surface manifestations (the projections 15) of the cover plate 10. While any conventional surface manifestations, provided in any conventional manner, may be used, in the preferred embodiment illustrated in FIGS. 3 and 4, the second locking surface manifestations comprise a plurality of elongated openings 43 provided in a slide 44 that is attached to and slideable with respect to, in the dimension of the arrows 45 in FIGS. 3 and 4, the housing surface 38. The openings 43 are of a number and dimension and configuration so as to properly cooperate with the projections 15. For example, each of the openings 43 has an enlarged portion 46 (see FIG. 3) that is larger than a projection head 17 with which it cooperates, and a channel portion 47 connected to the enlarged portion 46. The channel portion 47 is wider than a cooperating projection shaft 16, but narrower than a cooperating projection head 17. In that way when the head 17 enters the opening 46 and the slide 44 is reciprocated in the dimension 45 the shaft 16 slides in the channel 47, but the head 17 prevents the projection 15 from moving out of the opening 43.

The slide 44 may be made of any suitable material, such as hollow square aluminum tubing, plastic tubing, or the like. While any conventional mechanism for allowing one component to slide with respect to another may be utilized to guide the sliding movement in the dimension 45 of the slide 44 with respect to the surface 38, one particular structure for doing that which can be readily retrofit to existing housings 30 is illustrated schematically in FIG. 4. A fastener 50 is rigidly secured to the housing 30, passing through the surface 38. For example the fastener 50 may have a first head 51 that precludes the fastener 50 from being pulled through an opening 52 which extends through the housing 30 surface 38. In a bottom portion 53 of the slide 44 an elongated slot (having a length comparable to the desired length of travel of the slide 44 in dimension 45) 54 is provided. The fastener 50 has a shank 55 which extends through the slot 54, and is connected to a head 56. The head 56 engages the outer surface 57 of the slide portion 53 and is larger than the width of the slot 54 so that the fastener 50 prevents the slide 44 from being detached from the housing 30, although it can slide in the dimension 45 the full length of travel provided by the slot 54, which slot 54 is elongated in the dimension 45. While only one such fastener 50 and associated slot 54 is illustrated in FIG. 4, it is preferred that a plurality of such fasteners and slots are associated with the slide 44, for example four evenly spaced in a rectangular configuration on the surface 38.

While a plurality of slides 44 may be provided, preferably a single slide 44 is provided, having legs 60 (which have as a part thereof the bottom portions 53) which straddle the male electrical plug 35. Also the slide 44 preferably has a handle portion 61 of any suitable configuration which is always spaced from the housing 30 for ready grasping by a user's hand so that the slide 44 may readily be reciprocated in the dimension 45 to either lock the surface manifestations 15, 43 together, or move them into a position where they may be readily detached by pulling the housing 30 away from the cover plate in the dimension perpendicular to the surface 12.

FIG. 5 schematically illustrates a typical embodiment of structure facilitating the practice of a method according to the invention, of providing a securely affixed but readily removable extension cord 31 in association with a duplex or fourplex electrical outlet 22 in a building or vehicle, and the electrical outlet 22 including at least two female electrical receptacles 14 in a wall 63 of a building or vehicle, the outlet 22 having a conventional existing cover plate 64. The screw 20 is unscrewed from the opening 21 and the cover plate 64 is removed, as indicated by the arrow 65 in FIG. 5. Then the cover plate 10 is installed in place of the removed cover plate 64. This may be accomplished by aligning the openings 13 with the female electrical receptacles 14 and aligning the opening 19 with the opening 21, and then screwing the screw 20 through the opening 19 into the threaded opening 21. Additional conventional screws (not shown) may be passed through the openings 23 into the joist 24 behind the wall 63, and adjacent the outlet 22.

Once the cover plate 10 is secured in place, one can push the prongs 36, 37 of the male plug 35 into the top female receptacle 14 (or into the bottom one, or either, depending upon the exact design of the structure). This is done with the slide 44 in a position in which the enlarged portions 46 of the openings 43 are precisely aligned with the projection heads 17 so that the heads 17 penetrate the openings 43 into the hollow interior of the legs 60 (see the hollow interior in FIG. 4). Then the slide 44, by the user grasping the handle 61, is reciprocated in the dimension 45 (moved downwardly in the orientation illustrated in FIG. 3) so that the channel portions 47 of the openings 43 move with respect to the shafts 16 of the projections 15, and under the heads 17. The heads 17 engage the interior surfaces 68 (see FIG. 4) of the legs 60 to preclude the cover plate and the housing 13 from being detached from each other (and therefore preclude the male plug 35 from being pulled out of the female socket 14 in which it is disposed) until the slide 44 is again reciprocated (moved upwardly in the dimension 45 as seen in FIG. 3) so that the enlarged portions 46 of the openings 43 are again aligned with the projection heads 17.

All of the components of the combination according to the invention may be made of any suitable material, such as metal or plastic. Also, the invention is not limited by size.

It can be used to accommodate electrical cords of almost any length, such as between about 10–40 feet. The weight, strength, and integrity of the components can be enhanced for specialty uses, and the invention may be used in residential, industrial, or commercial environments. Any accessory components commonly used with electrical cords or the like may be provided, such as on/off switches at the end of the electrical cord, built into the casing, or the like or other types of switches, fault interrupters, etc. For ease of manufacture, a duplex plate of FIG. 1 may have the associated protrusion (e.g. elements 15) cut and stamped out, instead of being welded on, or otherwise affixed to the plate. Also, the slide 44 can be adapted for use without the electrical reel cord device for securing other units or devices to an electrical outlet.

It will thus be seen that according to the present invention a highly advantageous, simple, and effective, electrical outlet cover plate, reeled electrical cord assembly, and combination thereof, have been provided that may be used in a simple and effective manner to securely affix a readily removable electrical cord (preferably an extension cord) in association with a conventional duplex or fourplex electrical outlet. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent products and methods.

What is claimed is:

1. An electrical outlet cover plate and reeled electrical cord combination, comprising:

an electrical outlet cover plate having a front surface, and at least two openings therein dimensioned and constructed so as to receive female electrical receptacles therethrough;

a plurality of first locking surface manifestations formed with said front surface;

a reeled electrical cord in a housing, said housing having a first surface;

a plurality of second locking surface manifestations formed with said first surface for cooperating with said first locking surface manifestations to releasably hold said housing to said cover plate; and a male electrical plug extending outwardly from said first surface and insertable into a female electrical receptacle passing through one of said openings in said cover plate while said locking surface manifestations hold said housing and cover plate together.

2. A combination as recited in claim 1 wherein said reeled electrical cord has first and second ends, and at least one female plug at or adjacent said first end thereof exterior of said housing, and wherein said male electrical plug is electrically connected to said second end of said reeled electrical cord.

3. A combination as recited in claim 1 wherein said first locking surface manifestations comprise a plurality of projections, each having a shaft extending outwardly from said cover plate, and an enlarged head spaced from said cover plate; and wherein said second locking surface manifestations comprise a plurality of elongated openings each having an enlarged portion larger than a cooperating projection head, and a channel portion wider than a cooperating projection shaft, but narrower than a cooperating projection head.

4. A combination as recited in claim 3 wherein said plurality of first and second locking surface manifestations comprises four each of said first and second locking surface manifestations.

5. A combination as recited in claim 4 wherein said at least one slide comprises a single slide having two legs, which legs straddle said male electrical plug.

6. A combination as recited in claim 3 wherein said second locking surface manifestations are mounted to at least one slide which is connected to, and is slideable with respect to, said housing.

7. A combination as recited in claim 6 further comprising a central screw-receiving opening in said cover plate between said receptacle-receiving openings therein.

8. A combination as recited in claim 7 further comprising at least one additional screw hole in said cover plate remote from said central screw-receiving opening, and spaced from said receptacle-receiving openings.

9. A combination as recited in claim 8 further comprising at least first and second screws, passing through said central screw-receiving opening and said at least one additional screw hole, holding said cover plate to an electrical receptacle body comprising at least two female electrical receptacles, and holding said cover plate to a joist adjacent said receptacle body, respectively.

10. A cover plate for on electrical outlet in a building or vehicle, the electrical outlet including at least two female electrical receptacles in a wall of the building or vehicle and being positioned adjacent a joist in the wall of the building or vehicle, wherein the cover plate comprises:

a plate of metal or relatively rigid plastic having a front surface, said plate having a first portion which defines at least two openings therein which are dimensioned and constructed so as to receive the female electrical receptacles therethrough;

a plurality of locking projections integral with said first portion of said front surface and extending outwardly therefrom; and at least one screw-receiving hole in said first portion of said front surface and positioned between said at least two openings for receipt of a fastening screw therein to attach said plate to the electrical outlet which includes said at least two females electrical receptacles; and wherein said plate has a second portion laterally disposed relative to said first portion, said second portion of said plate having at least one additional screw-receiving hole therein for receiving a screw to attach said cover plate to a joist adjacent to the outlet in a building or vehicle.

11. A cover plate as recited in claim 10 wherein said plurality of projections each has a shaft extending outwardly from said cover plate, and an enlarged head spaced from said cover plate.

12. A cover plate as recited in claim 11 wherein said plurality of projections comprises four projections defining the corners of a rectangle within which said female receptacle-receiving openings are disposed.

13. A reeled extension cord assembly comprising:

a housing having a first surface;

a reeled extension cord disposed within said housing and having first and second ends;

at least one slide which is connected to, and is slideable with respect to, said housing first surface;

a plurality of locking openings formed in said slide;

a male electrical plug extending outwardly from said first surface and insertable in a female electrical receptacle; and at least one female plug at or adjacent said first end or said extension cord exterior of said housing; and wherein said male electrical plug is electrically connected to said second end of said reeled electrical cord.

14. An assembly as recited in claim 3 wherein said locking openings comprise a plurality of elongated openings each having an enlarged portion larger than a cooperating projection head, and a channel portion wider than a cooperating projection shaft, but narrower than a cooperating projection head.

15. An assembly as recited in claim 13 wherein said at least one slide comprises a single slide having two legs, which legs straddle said male electrical plug.

16. An assembly as recited in claim 14 wherein said plurality of locking openings comprises four locking openings.

17. A reeled extension cord assembly adapted to being removably coupled to a receptacle cover having a plurality of locking projections extending outwardly therefrom and being in covering relationship to a female receptacle, said assembly comprising:

a housing having a first surface;

a reeled extension cord disposed within said housing and having first and second ends;

at least one slide which is connected to said housing first surface for slidable movements with respect thereto between coupled and uncoupled conditions;

a plurality of locking openings formed in said slide;

a male electrical plug connected to said second end of said reeled electrical core and extending outwardly from said first surface of said housing; wherein said male electrical plug is insertable into the female receptacle when the locking openings of said at least one slide are aligned with a respective one of the plurality of locking posts extending outwardly from the receptacle cover while said at least one slide is in said uncoupled condition thereof, such that slidable movement thereafter of said at least one slide to said coupled condition thereof removably couples said at least one slide, and thus said housing, to said receptacle cover.

18. The reeled extension cord assembly as in claim 17, wherein said locking openings comprise a plurality of elongated openings having an enlarged portion larger than a cooperating projection head, and a channel portion wider than a cooperating projection shaft, but narrower than a cooperating projection head.

19. The reeled extension cord assembly as in claim 17, wherein said at least one slide comprises a single slide having two legs, which legs straddle said male electrical plug.

20. A reeled extension cord assembly as in claim 19, wherein said plurality of locking openings comprises four locking openings.

* * * * *

UNITED STATES PATENT AND TRADEMARK OFFICE
CERTIFICATE OF CORRECTION

PATENT NO. : 6,346,006  
DATED : February 12, 2002  
INVENTOR(S) : Edward W. Smith Page 1 of 1

It is certified that error appears in the above-identified patent and that said Letters Patent is hereby corrected as shown below:

<u>Title page,</u>
Item [76], Inventor, change "Edward E. Smith" to -- Edward W. Smith --;

Signed and Sealed this

Seventh Day of May, 2002

Attest:

Attesting Officer

JAMES E. ROGAN
*Director of the United States Patent and Trademark Office*